United States Patent
Ishihara

(10) Patent No.: US 7,327,284 B2
(45) Date of Patent: *Feb. 5, 2008

(54) SMART ALTITUDE CALLOUT FOR HELICOPTERS

(75) Inventor: Yasuo Ishihara, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/160,509

(22) Filed: Jun. 27, 2005

(65) Prior Publication Data

US 2007/0013558 A1    Jan. 18, 2007

(51) Int. Cl.
    *G08B 21/00* (2006.01)
(52) U.S. Cl. ............. 340/946; 340/945; 340/961; 340/963; 340/970; 340/973; 340/977; 701/9; 701/14; 701/15; 701/301
(58) Field of Classification Search ......... 340/945, 340/946, 947, 948, 961, 963, 970, 972, 973, 340/977; 701/9, 14, 15, 301
See application file for complete search history.

(56) References Cited

U.S. PATENT DOCUMENTS

| | | | |
|---|---|---|---|
| 5,839,080 A | 11/1998 | Muller et al. | |
| 6,038,498 A * | 3/2000 | Briffe et al. | ............ 701/3 |
| 6,043,758 A | 3/2000 | Snyder, Jr. et al. | |
| 6,304,800 B1 | 10/2001 | Ishihara et al. | |
| 6,643,580 B1 * | 11/2003 | Naimer et al. | ......... 701/206 |
| 6,785,594 B1 | 8/2004 | Bateman et al. | |
| 7,133,754 B2 | 11/2006 | Ishihara et al. | |
| 2004/0093131 A1 | 5/2004 | Block et al. | |

* cited by examiner

*Primary Examiner*—Hung Nguyen
(74) *Attorney, Agent, or Firm*—Black Lowe & Graham PLLC

(57) ABSTRACT

A method, computer software product, and system to generate altitude callouts according to proximity to a runway at an airport or heliport includes determining whether the helicopter is flying in proximity to the runway and automatically selecting an altitude threshold increment set based upon the determination. The threshold increment set including a plurality of altitude threshold values. A calculated terrain clearance value is calculated for each of the plurality of altitude threshold values. A suitable warning is automatically generated according to the comparison. Selecting an altitude threshold increment set includes selecting one of the group consisting of first altitude threshold increment set including a plurality of higher altitude threshold values and a second altitude increment set including the plurality of higher altitude threshold values and further including a plurality of lower altitude threshold values.

17 Claims, 4 Drawing Sheets

SMART ALTITUDE CALLOUT FOR HELICOPTERS

BACKGROUND OF THE INVENTION

Helicopters take off from and land at airports, as well as a multitude of off-airport sites. However, helicopters are often flown differently around airports than at other landing zones. This may be due to several reasons, including noise abatement or presence of fixed-wing air traffic.

Several avionics devices include an aural altitude callouts to indicate to the pilot the height over terrain rather than an absolute altitude over sea level. Such altitude callouts allow a helicopter pilot to properly remain either in an approved approach to a runway or within an operating height for moving along taxiways or other movement proximate to the airport or heliport. Unfortunately, air traffic communications during landing and transitioning to ground traffic include critical information. At times, these callouts will occur just when critical air traffic communication with the tower is necessary to avoid other aircraft near the airport or heliport. Where the pilot cannot hear the air traffic communication because of the aural callouts, the pilot may move the helicopter into unsafe or inappropriate positions relative to the runway or heliport.

When helicopter pilots approach to land off an airport site, the pilots generally do not need aural altitude threshold callouts at selected increments closer to the ground (such as 50, 40, 30, 20, 10). However, when they operate outside of the controlled airport space, the detailed altitude callouts closer to the ground facilitate operation such as landing at an accident scene or dusting crops.

There is an unmet need in the art for an onboard system that will generate altitude callouts and in doing so automatically or selectably alternate between suppressing and allowing a set of lower altitude threshold callout increments based upon proximity to an airport or heliport.

SUMMARY OF THE INVENTION

An enhanced ground proximity warning system ("EGPWS") knows locations of runways at airports from an internal runway database. When the helicopter is near an airport or heliport defined in the database, a different altitude callout menu can be automatically selected, which has optionally either coarser or finer callout intervals.

A method, computer software product, and system to generate altitude callouts according to proximity to a runway at an airport or heliport includes determining whether the helicopter is flying in proximity to the runway and automatically selecting an altitude threshold increment set based upon the determination. The threshold increment set including a plurality of altitude threshold values. A calculated terrain clearance value is calculated for each of the plurality of altitude threshold values. A suitable warning is automatically generated according to the comparison. Selecting an altitude threshold increment set includes selecting one of the group consisting of first altitude threshold increment set including a plurality of higher altitude threshold values and a second altitude increment set including the plurality of higher altitude threshold values and further including a plurality of lower altitude threshold values.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

By way of overview, a method, computer software product, and system to generate altitude callouts according to proximity to a runway at an airport or heliport includes determining whether the helicopter is flying in proximity to the runway and automatically selecting an altitude threshold increment set based upon the determination. The threshold increment set including a plurality of altitude threshold values. A calculated terrain clearance value is calculated for each of the plurality of altitude threshold values. A suitable warning is automatically generated according to the comparison. Selecting an altitude threshold increment set includes selecting one of the group consisting of first altitude threshold increment set including a plurality of higher altitude threshold values and a second altitude increment set including the plurality of higher altitude threshold values and further including a plurality of lower altitude threshold values.

Figure 1:
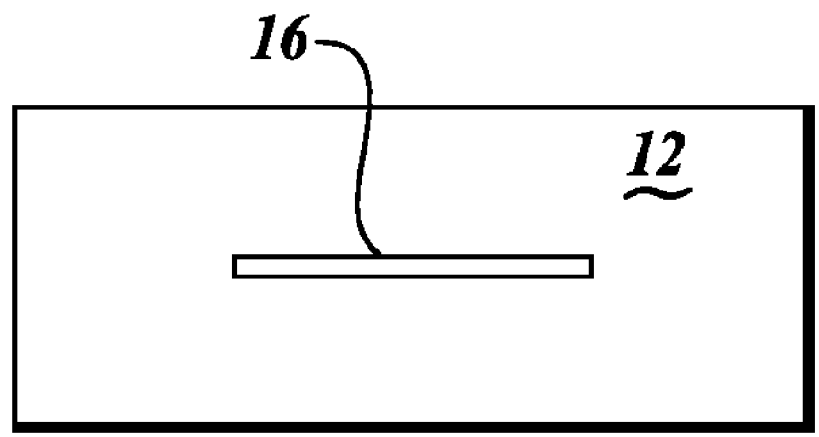
FIG. 1 illustrates a flying environment in a vicinity of an airport runway.

The flying environment of a helicopter in the context of the present invention is explained as follows. FIG. 1 is an overhead view of an airport and area around the airport. In FIG. 1, a helicopter (not shown) may operate in the air in one of two zones 12, or 14.

In the second zone 14, the helicopter is outside of an area adjacent to or on a runway 16, taking off, or flying near an airport. The approach may be an instrument approach, such as an Instrument Landing System (ILS) approach, a Global Positioning System (GPS) approach, or any other landing approach, or may be a visual flight rules (VFR) straight-in landing approach. In the second zone 14, the embodiments are configured to generate callouts at a series of thresholds at an upper set of altitude threshold callouts increments and at a lower set of altitude threshold callout increments because altitude callouts are useful for operations in the second zone. Additionally, in the second zone 14, the altitude callouts are useful to the pilot especially when integrated with other features of an Enhanced Ground Proximity Warning System ("EGPWS") would alert to altitudes that were dangerously close to terrain. The invention, however, is suitably configured to operate in the second zone 14 as well.

As is known, when a helicopter is operating outside of an airport environment, a helicopter may perform relatively extreme flying maneuvers, such as steep dives or steep banks. Based upon calculated heights of the helicopter or heights indicated by a radio altimeter over the terrain during such flying maneuvers, the present invention advantageously informs by means of aural callouts of height above the terrain as the helicopter is operating in the second zone 14 according to both the set of higher altitude thresholds increments and the set of lower altitude threshold increments.

In the first zone 12, the helicopter is operating in an airport environment and, specifically, may be operating in a runway environment. In the first zone 12, air traffic communication is frequent and very directive indicating either appropriately safe maneuvering instructions or a hand-off from air to ground traffic control for movement of airframes about the airport.

Figure 2:
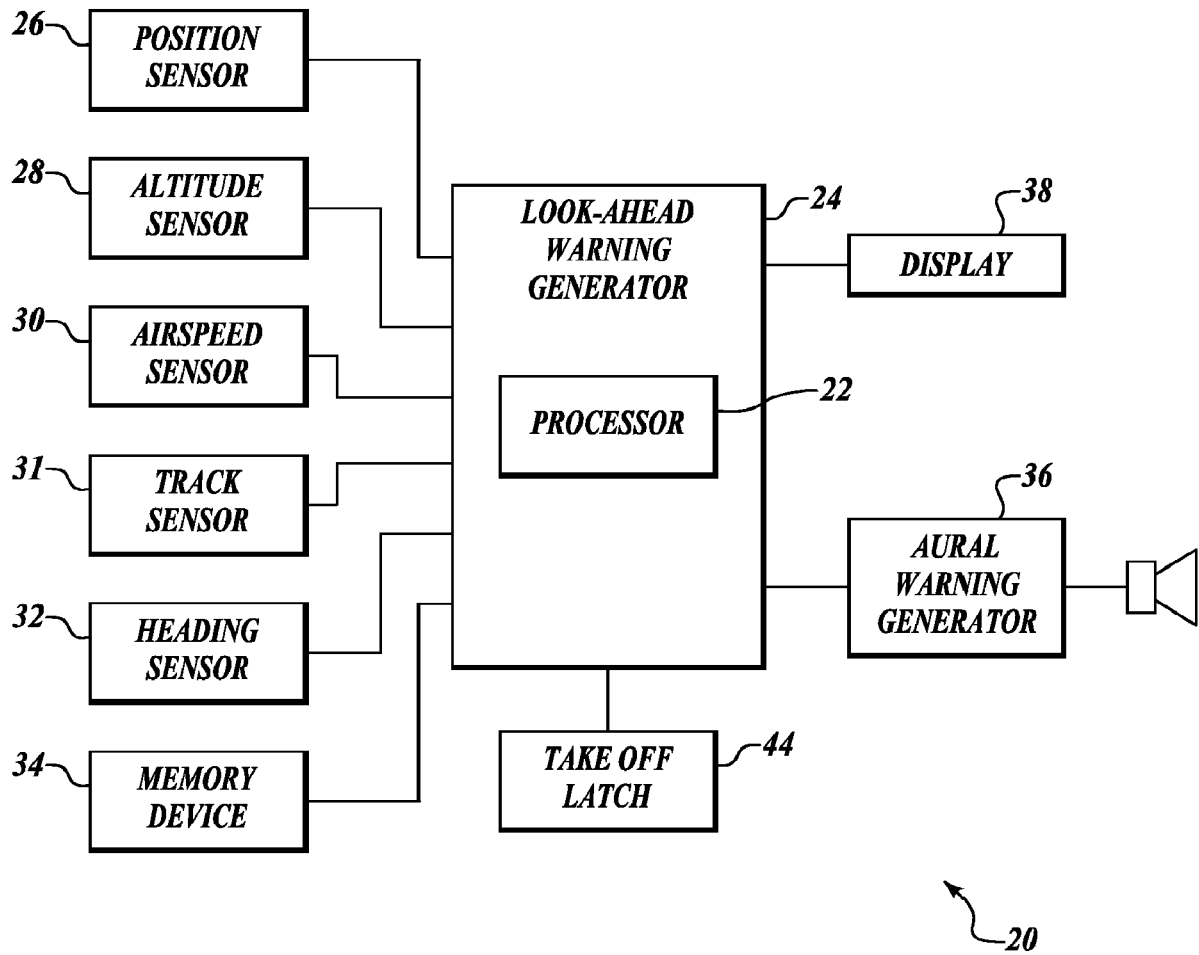
FIG. 2 is a block diagram of an exemplary system formed in accordance with an embodiment of the present invention.

Given the described flying environment of the helicopter in the context of the present invention, details of exemplary embodiments of the present invention are set forth as follows. Referring now to FIG. 2, an exemplary system 20 is configured to monitor space in front of and below a helicopter, and is configured to automatically determine whether the helicopter is flying an approach to a runway. Advantageously and according to an embodiment of the present invention, the system 20 is also configured to automatically modulate the monitored space in front of and below the helicopter to a smaller volume of space when the helicopter is determined to be flying an approach to the runway.

As used herein, monitoring space in front of and below the helicopter refers to generating a look-ahead warning. The look-ahead aspect of the present invention is a common feature of avionics that might exploit the instant invention, however, the invention may operate without having a look-ahead warning system. Generating a look-ahead warning is currently known in the art of avionics. For example, generation of a look-ahead warning is set forth in U.S. Pat. No. 6,304,800, the contents of which are hereby incorporated by reference. For sake of clarity, however, some details regarding generating a look-ahead warning are set forth below.

A look-ahead warning generator 24 analyzes terrain and aircraft data and generates terrain profiles surrounding the aircraft. The generator 24 includes a processor 22. The processor 22 may either be part of the generator 24, or may be a separate processor 22 located either internal or external to the generator 24. In one exemplary embodiment of the present invention, the processor 22 suitably is an EGPWS processor, available from Honeywell International, Inc. Details of an EGPWS processor are set forth in U.S. Pat. No. 5,839,080, the contents of which are hereby incorporated by reference. FIG. 2 depicts many of the components of the EGPWS of U.S. Pat. No. 5,839,080 in simplified block format for illustrative purposes. However, it is understood that the functions of these blocks are consistent with and contain many of the same components as the EGPWS described in U.S. Pat. No. 5,839,080 incorporated by this reference.

In the first zone 12 (FIG. 1) the processor 22 receives an altitude from the altitude sensor 28 and a position, optionally including an altitude, from the position sensor 26 and also accesses the memory device 34 and obtains data relating to the runway. Using the aircraft altitude information and the runway information, the processor 22 determines an aircraft height, meaning a distance by which the aircraft altitude exceeds the terrain altitude at the position of the aircraft. Alternatively, the processor 22 receives a terrain clearance height from a radio altimeter (not shown) indicating a height the helicopter is flying above the ground. Where available, a radio altimeter derived terrain clearance height is used to indicate a terrain clearance. Where the terrain clearance height indicates that the aircraft height passes through a selectable threshold, the processor 22 causes the aural warning generator 36 to generate an altitude callout indicative of the selectable threshold. Because the callouts are configured to substitute for air traffic communication, at least one embodiment will emit the aural warnings as either recordings or synthesized statements to the effect of, by way of non-limiting example, "10 feet," "20 feet," "30 feet," "40 feet," and "50 feet" according to the helicopter's height above the terrain.

Advantageously, embodiments of the present invention also determine whether the helicopter is flying proximate to a runway. This runway selection feature is described in U.S. Pat. No. 6,304,800, the contents of which are hereby incorporated by reference. For sake of clarity, some details from U.S. Pat. No. 6,304,800 are included herein.

Still referring to FIG. 2, the processor 22 advantageously and automatically determines whether the helicopter is flying an approach to the runway or operating within the second zone 12 (FIG. 1). The processor 22 initially receives data from the various sensors 26, 28, 30, 31 or 32 pertaining to the aircraft. Additionally, the processor 22 also accesses the memory device 34 and obtains data relating to the runway. Using the aircraft and runway information, the processor 22 determines a reference angle deviation between the aircraft and the runway. Based on a reference angle deviation associated with the runway, the processor 22 automatically determines whether the aircraft is likely to land on the runway. Whether the pilot of an aircraft intends to land on the runway may be determined based on the relationship of a position (i.e., latitude and longitude) of the aircraft in relation to the position of the runway, the direction in which the aircraft is flying in relation to the direction in which the runway extends, or the approach angle of the aircraft with relation to the runway location or a combination of these reference deviation angles.

As described above and according to embodiments of the present invention, once the helicopter enters the first zone 12 (FIG. 1) in proximity to the heliport or runway 16 (FIG. 1), or when the pilot selectably engages embodiments of the invention, the invention shifts to suppress the set of lower altitude callout increments. By way of nonlimiting example, when an embodiment of the invention is selectably engaged or when in proximity to an airport or heliport, the aural callouts associated with the lower set of altitude threshold increments are suitably suppressed. Such set of altitude threshold increments includes, by way of nonlimiting example, threshold heights of 10, 20, 30, 40, and 50 feet. In the exemplary situation, a helicopter as it taxis along a taxiway may be suitably selected to suppress the aural warning generator from sounding callouts at each of 10, 20, 30, 40, and 50 feet as it passes through each of the thresholds.

Figure 3:
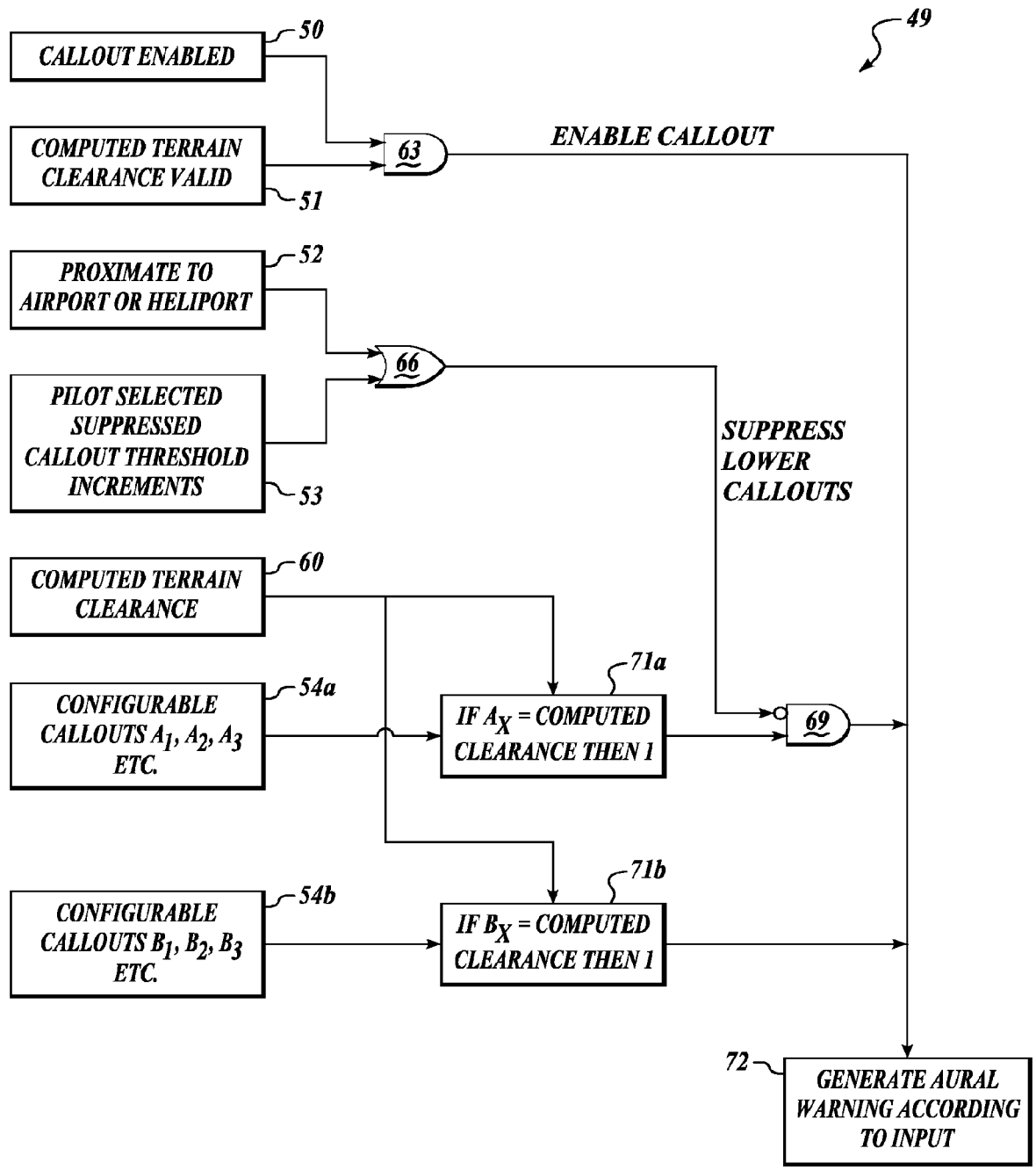
FIG. 3 is a logic diagram of processing performed according to an embodiment of the present invention.

Referring now to FIG. 3, a logic diagram 49 of the logic for generating an alert according to embodiments of the invention includes an input at a latch 50 configured to indicate whether the callout is enabled. In one embodiment activating the first latch 50 allows the pilot to selectably disable the embodiment thereby suppressing any callouts.

A second latch 51 is configured to indicate where the EGPWS has established good agreement between data stored in the memory device 34 (FIG. 2) and information from the position sensor 26 (FIG. 2) and the altitude sensor 28 (FIG. 2) to compute a terrain clearance according to the means described herein to indicate that valid terrain callouts can be derived from a computed terrain clearance. Where either of the first or the second latches 50, 51 are not in a "yes" state, an AND gate 63 will send a "disabled" or "no" logical signal to aural warning generator 36 (FIG. 2) to prevent the system from generating an aural warning signal at a warning network 72. Where both of the first and the second latches 50, 51 are in a "yes" state, the AND gate 63 will send an "enabled" or "yes" logical signal to aural warning generator 36 (FIG. 2) to allow the system to generate an aural warning signal at a warning network 72.

A third latch 52 is used to indicate whether the system 20 (FIG. 2) has determined that the helicopter is in the second zone 12 (FIG. 1) according to the above-described embodiment of the invention. The third latch 52 is configured to hold a logical "yes" when the helicopter is in the second zone 12 (FIG. 1) and therefore presumptively in an area where the finer altitude callout threshold increment is desired.

A fourth latch 53, allows a pilot to force the suppression of the lower altitude callout threshold increments. In areas outside of the first zone 12 (FIG. 1), there are times when the altitude callouts will aid in achieving level flight. An OR gate 66 allows either of the third latch 52 or the fourth latch 53 to suitably suppress the lower altitude callouts holding a logical "yes" at the output of the OR gate 66. Otherwise, the lower altitude callouts are enabled.

At least one embodiment is configured to hold a set of configurable lower altitude callout threshold increments, stored at memory sites such as the lower altitude threshold increment memory 54a, as successive configurable constants $A_1$, $A_2$, $A_3$, etc. For this non-limiting exemplary embodiment, the higher altitude set of callout threshold increments are stored at the higher altitude threshold increment memory 54b, as successive configurable constants $B_1$, $B_2$, $B_3$, etc. Other means of accomplishing the storage or generation of both of the lower and the higher sets of altitude callout threshold increments is by look-up tables, configurable ROM, or hard-wired constant values.

The system 20 (FIG. 2) uses data stored in the memory device 34 (FIG. 2) and information from the position sensor 26 (FIG. 2) and the altitude sensor 28 (FIG. 2) to compute a terrain clearance according to the means described herein; that result is stored at a terrain clearance latch 60. Alternatively, a radio altimeter outputs values indicative of a terrain clearance that are suitably used as the computed terrain clearance. A series of comparators 71a and 71b compare the value stored at the terrain clearance latch 60 to the value stored at the higher altitude threshold increment memory 54b and additionally to the outputs of the lower altitude threshold increment memory 54a where suitably based upon the logical value at the output of the OR gate 66. Where the values at the computed terrain clearance latch 60 and at the higher altitude threshold increment memory 54b and additionally to the outputs of the lower altitude threshold increment memory 54a where suitably based upon the logical value at the output of the OR gate 66 are equal, the comparators 71a, 71b send a suitable activating signal activating the suitable aural warning at the aural warning network 72 according to logical signals at the output of the AND gate 69 and the AND gate 63.

Figure 4:
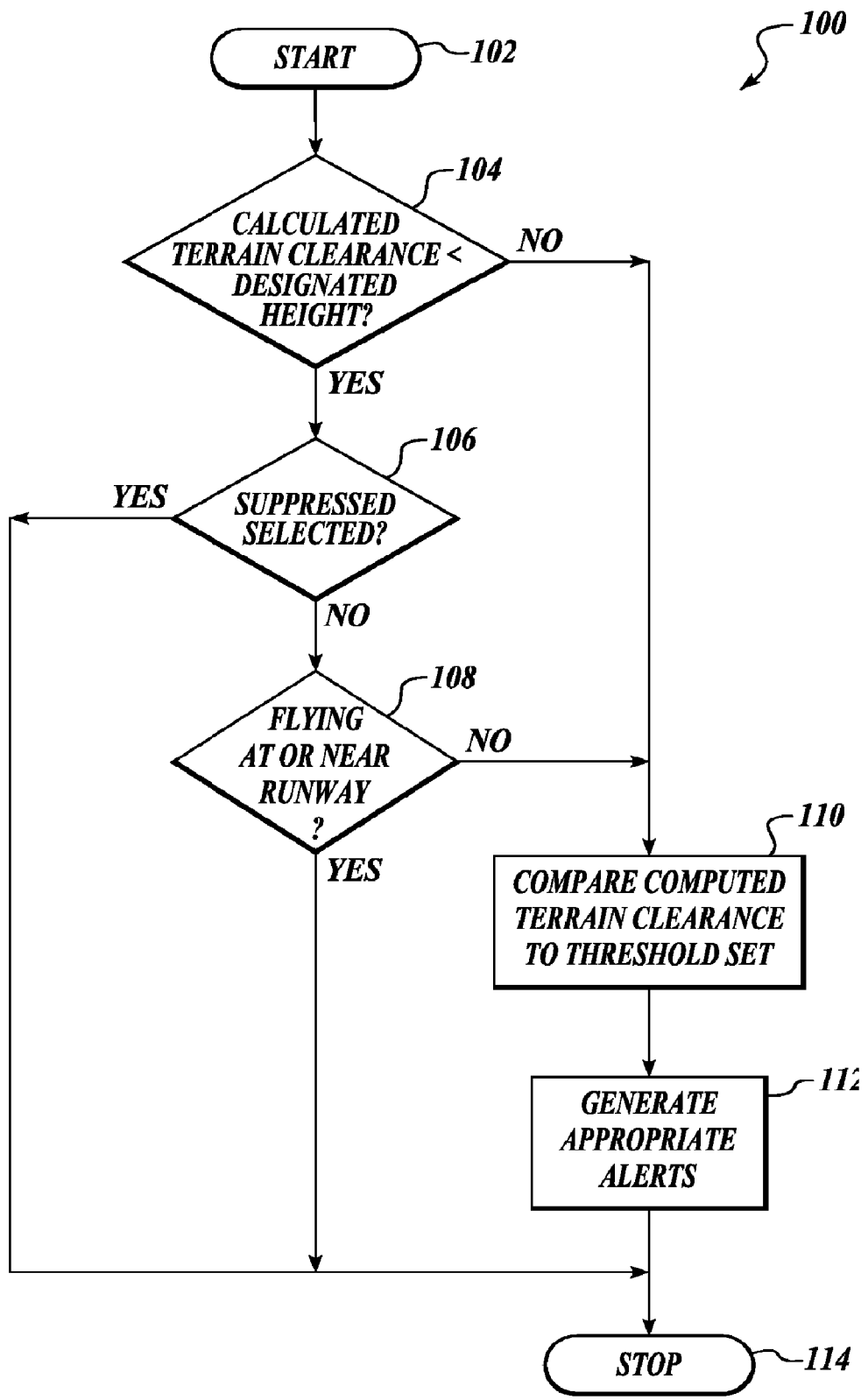
FIG. 4 is a flow chart of an exemplary method according to an embodiment of the present invention.

Referring now to FIG. 4, a method 100 for using airport information based on the flying environment begins at a block 102. Details of processing performed at blocks of the method 100 have been set forth above in discussions of FIGS. 1-3. It will be appreciated that processing to effect the method 100 suitably is implemented in software running on the processor 22 (FIG. 2).

At a decision block 104, a first latch is monitored, the first latch configured to indicate a condition where the calculated terrain clearance (whether derived from the database or the radio altimeter) exceeds a configurable constant. By way of nonlimiting example, the configurable value of 50 feet will suppress callouts in the course of normal ground movement maneuvers in proximity to the airport.

At a decision block 106, a selectable second latch is monitored, the second latch is configured to indicate a pilot preference for suppressing the lower set of altitude callout threshold increments has been selected. If the lower altitude callout threshold increments have been selected to be suppressed, at the decision block 106, no callouts occur at the lower altitude callout threshold increments.

At a decision block 108, a third latch is monitored, the third latch is configured to indicate a determination made as to whether the helicopter is flying at or near an airport or heliport, essentially within the first zone 12 (FIG. 1). Where the helicopter is in the first zone 12, the lower altitude callout threshold increments are not called out.

If either at the block 106 or at the block 108, a "yes" is suitably determined, the method 100 proceeds to a block 114 allowing the method 100 to restart at the block 102. Otherwise the computed terrain clearance is compared to values contained in the finer threshold increment set monitored at a block 110. Where the computed terrain clearance is found to equal one of the values contained in the finer threshold increment set, the appropriate altitude callouts are generated by the EGPWS according to the value determined to equal the computed terrain clearance. The method 100 ends at the block 114 for suitably cycling back to the block 102.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method of generating altitude callouts according to proximity of a helicopter to a runway at an airport or heliport, the method comprising:
   determining whether the helicopter is flying in proximity to the runway;
   automatically selecting an altitude threshold increment set based upon the determination, the threshold increment set including a plurality of altitude threshold values;
   comparing a calculated terrain clearance value to each of the plurality of altitude threshold values; and
   automatically generating a suitable warning according to the comparison.

2. The method of claim 1, wherein selecting an altitude threshold increment set includes selecting one of the group consisting of first altitude threshold increment set including a plurality of higher altitude threshold values and a second altitude increment set including the plurality of higher altitude threshold values and further including a plurality of lower altitude threshold values.

3. The method of claim 2, wherein the first altitude threshold increment set includes values configured to suppress generating suitable warnings during one of taxiing flight or approach at the airport.

4. The method of claim 2, wherein the second altitude threshold increment set includes values configured to accommodate an approach to off-airport landing site.

5. The method of claim 1, wherein selecting an altitude threshold increment set is according to a state of a switchable latch.

6. The method of claim 5, wherein the switchable latch is manually switchable.

7. The method of claim 5, wherein the switchable latch is automatically switchable.

8. A system for generating altitude callouts according to proximity of a helicopter to a runway at an airport or heliport, the system comprising:
   a processor including:
      a first component configured to determine a logical value, the logical value configured to indicate whether the helicopter is flying in proximity to the runway;
      a second component configured to automatically select an altitude threshold increment set based upon the logical, the threshold increment set including a plurality of altitude threshold values;

a third component configured to compare a calculated terrain clearance value to each of the plurality of altitude threshold values; and a fourth component configured to generate a suitable warning according to the altitude threshold value equal to the terrain clearance value.

9. The system of claim 8, wherein the second component is further configured to select one of the group consisting of first altitude threshold increment set including a plurality of higher altitude threshold values and a second altitude increment set including the plurality of higher altitude threshold values and further including a plurality of lower altitude threshold values.

10. The system of claim 9, wherein the first altitude threshold increment set includes values configured to suppress generating suitable warnings during one of taxiing flight or approach at the airport.

11. The system of claim 9, wherein the second altitude threshold increment set includes values configured to accommodate an approach to off-airport landing site.

12. The system of claim 8, wherein selecting an altitude threshold increment set is according to a state of a switchable latch.

13. A computer program stored on a computer readable medium, the computer program configured to generating altitude callouts according to proximity of a helicopter to a runway at an airport or heliport, the computer program comprising:

a first component configured to determine a logical value, the logical value configured to indicate whether the helicopter is flying in proximity to the runway;

a second component configured to automatically select an altitude threshold increment set based upon the logical value, the threshold increment set including a plurality of altitude threshold values;

a third component configured to compare a calculated terrain clearance value to each of the plurality of altitude threshold values; and a fourth component configured to generate a suitable warning according to the altitude threshold value equal to the terrain clearance value.

14. The computer program of claim 13, wherein the second component is further configured to select one of the group consisting of first altitude threshold increment set including a plurality of higher altitude threshold values and a second altitude increment set including the plurality of higher altitude threshold values and further including a plurality of lower altitude threshold values.

15. The computer program of claim 14, wherein the first altitude threshold increment set includes values configured to suppress generating suitable warnings during one of taxiing flight or approach at the airport.

16. The computer program of claim 14, wherein the second altitude threshold increment set includes values configured to accommodate an approach to off-airport landing site.

17. The computer program of claim 13, wherein selecting an altitude threshold increment set is according to a state of a switchable latch.

* * * * *